United States Patent
Maxam

[11] Patent Number: 5,340,177
[45] Date of Patent: Aug. 23, 1994

[54] VEHICLE BUMPER WITH STEP

[75] Inventor: V. Dale Maxam, Spring Lake, Mich.

[73] Assignee: Shape Corporation, Grand Haven, Mich.

[21] Appl. No.: 111,621

[22] Filed: Aug. 25, 1993

[51] Int. Cl.⁵ .................................. B60R 19/48
[52] U.S. Cl. ........................... 293/117; 280/164.1
[58] Field of Search ............... 293/106, 116, 117; 280/505, 164.1; 224/42.03 R, 42.03 A, 42.04; D12/169

[56] References Cited

U.S. PATENT DOCUMENTS

| | | | |
|---|---|---|---|
| D. 157,321 | 2/1950 | Barden . | |
| D. 198,126 | 5/1964 | Cling | D12/169 |
| D. 212,939 | 12/1968 | Nunn . | |
| D. 223,752 | 6/1972 | Nunn . | |
| D. 297,724 | 9/1988 | Helber | D12/169 |
| D. 316,070 | 4/1991 | Riss | D12/169 |
| 1,317,112 | 9/1919 | Wasson | 293/102 |
| 2,492,914 | 12/1949 | Barden | 293/117 X |
| 3,137,516 | 6/1964 | Cline | 280/505 |
| 3,533,654 | 10/1970 | Kannegieter | 293/117 X |
| 3,578,358 | 5/1971 | Reynolds | 293/117 X |
| 3,606,385 | 9/1971 | Johannes | 293/106 X |
| 3,614,136 | 12/1969 | Dent | 280/500 |
| 3,664,685 | 5/1972 | Moline | 293/117 X |
| 3,675,947 | 7/1972 | Blagg | 293/117 X |
| 3,941,407 | 3/1976 | Breford | 280/505 X |
| 4,266,817 | 5/1981 | Mason et al. | 293/117 |
| 4,634,163 | 1/1987 | Bundy et al. | 293/117 |
| 4,674,782 | 6/1987 | Helber | 293/106 |
| 4,961,604 | 10/1990 | Kisner | 293/106 |
| 5,016,932 | 5/1991 | Carter | 293/106 |
| 5,092,512 | 3/1992 | Sturrus | 228/146 |

FOREIGN PATENT DOCUMENTS 2746235 7/1978 Fed. Rep. of Germany ... 224/42.04

*Primary Examiner*—Dennis H. Pedder
*Attorney, Agent, or Firm*—Price, Heneveld, Cooper, DeWitt & Litton

[57] ABSTRACT

A rear step bumper is provided for a vehicle. The bumper is roll-formed into a tubular shape and includes a top wall, a bottom wall, an inner wall, and an outer wall, and further includes ends and an intermediate section. The outer wall is sheared from the top wall and the bottom wall in the intermediate section, and also sheared transversely so as to form opposing panels, which opposing panels are bent toward the inner wall into engagement with the inner wall and secured to the inner wall. The opposing panels reinforce the tubular member in the intermediate section to maintain the structural integrity of the bumper, and further are integrally formed from material in the tubular member to facilitate manufacture and reduce costs. The method of manufacture is also disclosed.

16 Claims, 1 Drawing Sheet

VEHICLE BUMPER WITH STEP

BACKGROUND OF THE INVENTION

The present invention relates to vehicle bumpers, and in particular to a vehicle rear bumper with a step. The present invention further includes a method of manufacturing same.

Step bumpers are extremely old and are provided particularly for pick-up trucks whereby a step is provided in the bumper at a lower position from the top of the bumper so that one can first step on the step and then into the cargo box of the truck. The step also provides a surface for mounting a trailer hitch ball at a position lower than the top of the bumper.

Prior rear step bumpers have been constructed of a number of pieces of steel welded together to provide a hollow, elongated member. The construction of such bumpers has been very time consuming by reason of the time required for fabrication of the parts and welding together to provide a bumper with a step that is sufficiently strong for the purpose of functioning as a bumper and also as a step. Such operations in the fabrication and assembly of the parts of prior rear step bumpers add considerably to the manufacturing costs and require substantial amount of buttressing in order to provide sufficient strength to function as a bumper and a step.

Thus, a bumper solving the aforementioned problems is desired.

SUMMARY OF THE INVENTION

The present invention includes a bumper for a vehicle including an elongated roll-formed tubular member made from a single sheet of metal roll-formed to provide a top wall, a bottom wall, an outer wall and an inner wall, the inner wall being formed by welding the edges of the roll-formed sheet. The roll-formed tubular member has ends and an intermediate section. The outer wall and top wall in the intermediate section are cut to provide an opening in the top wall and opposing panels separated from the top wall and from the bottom wall so as to completely separate the panels from the top and bottom walls to thus form top edges and bottom edges, respectively. The outer wall is also cut to further separate the panels permitting them to be bent toward the inner wall. The opposing panels are each integrally connected to the outer wall and are bent toward and extend to the inner wall to expose the bottom wall in the intermediate section. The bent sections of the panels each further include a flange engaging the inner wall. Means are provided for securing each of the flanges to the inner wall, whereby the bottom wall in the intermediate section can be used as a step and the opposing panels reinforce the bumper in the intermediate section.

In another aspect, the present invention includes a method of forming a bumper. The method includes roll-forming from a single sheet of steel a tubular member having a top wall, a bottom wall, an inner wall, and an outer wall, cut to lengths to provide ends and an intermediate section. The method includes separating an intermediate section of the outer wall from the top wall and cutting an opening in the top wall and also separating the outer wall from the bottom wall in the intermediate section. Further, the method includes separating a first portion of the outer wall from a second portion of the outer wall in the intermediate section to form opposing panels, bending the opposing panels toward the inner wall, causing the panels to engage the inner wall, and securing the opposing panels to the inner wall. In the preferred embodiment, the steps of separating include shearing material in the walls.

The preferred embodiment of the present invention offers several advantages over known art. The bumper is roll-formed in high volume and at competitive cost. Further, the tubular shape of the bumper provides for high strength, which strength is maintained by the reinforced construction in the intermediate section of the bumper. The preferred embodiment further includes a strong and reinforced intermediate section, which can be manufactured efficiently. The rear step bumper is formed from material which is an integral part of the roll-formed tubular member and thus it does not require separately manufactured parts.

These and other features, advantages and objects of the present invention will be further understood and appreciated by those skilled in the art by reference to the following specification, claims and independent drawings.

DETAILED DESCRIPTION OF THE PREFERRED EMBODIMENT

Figure 1:
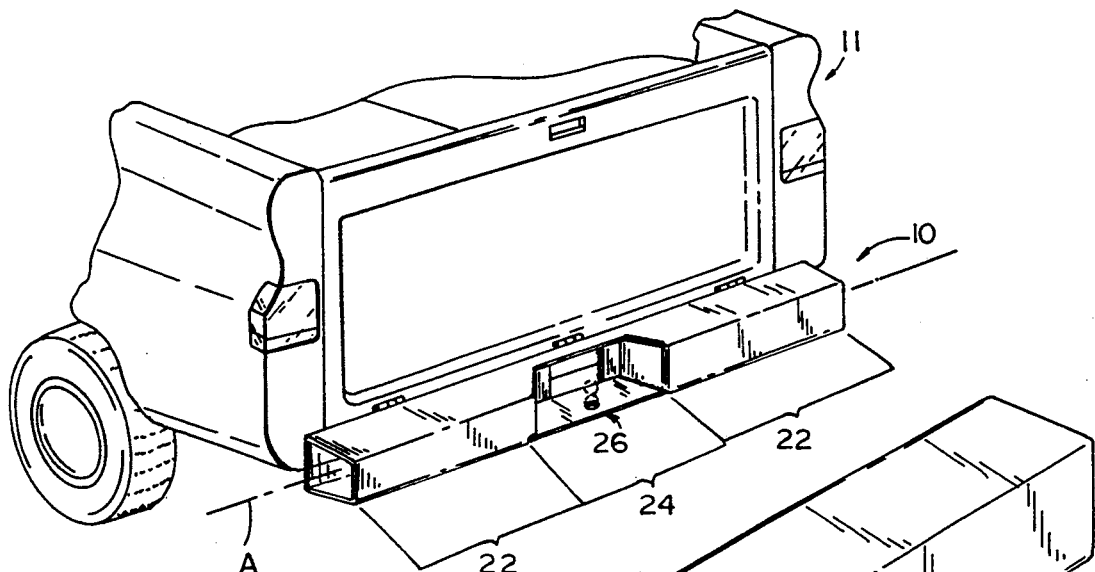
FIG. 1 is a perspective view of a vehicle including a bumper embodying the present invention.
Figure 2:
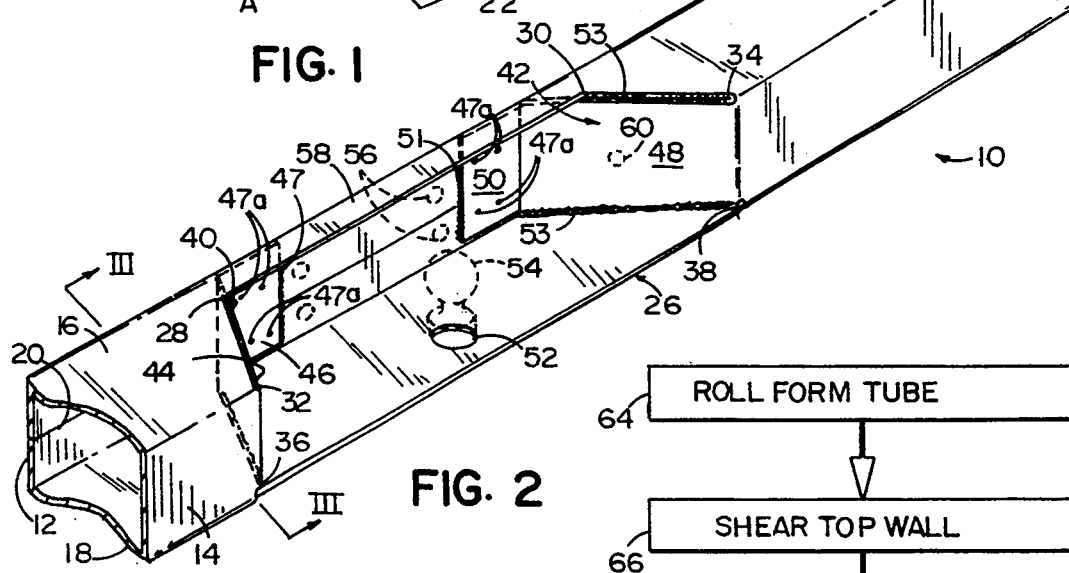
FIG. 2 is an enlarged perspective view of an intermediate section of the bumper shown in FIG. 1.
Figure 3:
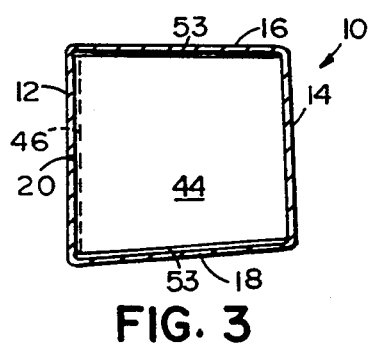
FIG. 3 is a cross-sectional view taken along the plane III—III in FIG. 2.

A bumper 10 (FIGS. 1-3) embodying the present invention includes a tubular member made by roll-forming a sheet of material into a tubular shape having a longitudinal axis "A". The tubular member includes a front inner wall 12, a rear outer wall 14, a top wall 16 and a bottom wall 18, all formed by the roll-forming process. The side edges of the sheet of material are welded along a weld bead 20 that is located on rear inner wall 12. It is contemplated that walls 12, 14, 16 and 18 can have various configurations and shapes and that weld bead 20 can be located in different locations as desired for particular applications. An exemplary tubular bumper and process are described in U.S. Pat. No. 5,092,512 entitled METHOD OF ROLL-FORMING AN AUTOMOTIVE BUMPER issued to Sturrus et al. on Mar. 3, 1992 the entire contents of which are incorporated hereinafter by reference. Bumper 10 includes ends 22 connected by an intermediate section 24. Ends 22 are configured for attachment to a truck 11, such as by including attachment holes (not shown) on front inner wall 12 in ends 22. A reinforced step 26 is formed in intermediate section 24. Specifically, top wall 16 is sheared along the longitudinal axis of the tubular member the length of intermediate section 24 from a first location 28 to a second location 30. The line of sheared material extends adjacent and parallel the front inner wall 12. Top wall 16 is also sheared at an angle transversely from the longitudinal axis from the first and second locations 28 and 30 to third and fourth locations 32 and 34, respectively. Third and fourth locations 32 and 34 are spaced rearwardly from first and second locations 28 and. 30 in top wall 16 and are located proximate the juncture between top wall 16 and rear outer wall 14.

The top wall 16 is further sheared parallel the juncture of the top wall 16 and the rear outer wall 14 from the third location 32 to the fourth location 34. This provides a vertically open area in bumper 10.

The rear outer wall 14 is also sheared along the longitudinal axis adjacent the juncture between the rear outer wall 14 and the bottom wall 18 from a fifth location 36 to a sixth location 38. The fifth location 36 is substantially vertically aligned with the third location 32, and the sixth location 38 is substantially vertically aligned with the fourth location 34. The rear outer wall 14 is further severed transversely about midway along intermediate section 24 to thus form opposing reinforcement panels 40 and. 42. The edges of panels 40 and 42 are formed by the sheared material between locations 32 and 34 and between locations 36 and 38, and further by the sheared material which forms the ends of opposing panels 40 and 42. Opposing panel 40 includes an angular section 44 joined to outer wall 14 and bent toward front inner wall 12, and an attachment flange or tab 46 extending from angular section 44. Attachment flange 46 engages and is attached to front inner wall 12 by a weld bead 47 and spot welding 47a, although it is contemplated that various methods of attachment can be used. The angularity of angular section 44 extends generally parallel and under the line of shear extending between locations 28 and 32.

Opposing panel 42 is generally comparable to opposing panel 40 but is a mirror image thereof. Specifically, outer panel 42 includes an angular section 48 extending from rear outer wall 14, and an attachment flange or tab 50 extending from angular section 48 abuttingly into engagement with front inner wall 12 where it is secured in place by a weld bead 51. Panels 40 and 42 act to rigidify intermediate section 24 thus maintaining the structural integrity of bumper 10. It is contemplated that angular sections 44 and 48 will be welded along their lower and upper edges 53 although in some instances this may not be required. Notably, bottom wall 18 within intermediate section 24 is exposed and is adapted to act as a step such as for stepping into the rear of truck 11.

Bumper 10 can include various options. A hole 52 is formed in bottom wall 18 such as for receiving a trailer hitch ball 54. Still further, holes 56 are added to front inner wall 12, holes 56 being adapted to receive grommets (not shown) such as for retaining a license plate to bumper 10. Notably the line of shear between locations 28 and 30 leaves a flange 58 along the rear of top wall 16 in intermediate section 24, flange 58 further rigidifying bumper 10 and also partially protecting a license plate (not shown) positioned within the step area. Still further, a hole 60 is added for receiving a license plate light (not shown). Further, additional reinforcements such as plates or brackets (not shown) can be added to intermediate section 24 if desired, such as along bottom wall 18 to support trailer hitch ball 54 and the weight of a trailer being supported on the ball.

Figure 4:
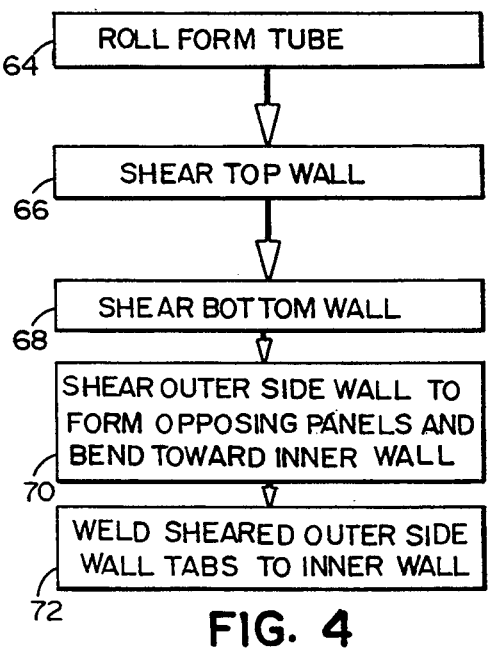
FIG. 4 is a flow diagram illustrating the method of manufacture of the bumper embodying the present invention.

The method of manufacturing bumper 10 is as follows. Bumper 10 (FIG. 4) is first roll-formed to the desired cross-sectional shape in a step 64, such as disclosed in the above noted U.S. Pat. No. 5,092,512 which was incorporated by reference. During step 64, the edges of the roll-formed sheet are welded together so that a continuous roll-formed robe is thus manufactured. The tube is then cut to length to form the above noted tubular member. A trapezoidally-shaped section of material is then sheared or punched from top wall 16 in step 66, the trapezoidal shape being defined by locations 28, 30, 32 and 34. Bottom wall 18 is sheared from rear outer wall 14 in step 68 proximate the line of joinder between locations 36 and 38. In a next step 70, rear outer wall 14 is sheared transversely about midway along intermediate section 24 to form opposing panels 40 and 42, and opposing panels 40 and 42 are bent forwardly to thus form angular sections 44 and 48 that extend angularly at an acute angle from rear outer wall 14 toward front inner wall 12. As panels 40 and 42 are bent toward front inner wall 12, attachment flanges 46 and 50 are formed which abuttingly engage front inner wall 12. Attachment flanges or tabs 46 and 50 are welded or otherwise mechanically secured such as by rivets or toggle-locking to front inner wall 12 in step 72 at least along their extreme ends 60 and 62, but also preferably along upper and lower side edges 40 and 42 if added strength is desired. Additional holes are formed in bumper 10, as desired, including hole 52 for trailer hitch ball 54, license plate holes 56 for grommets for chaining the license plate, hole 60 for a license plate light, and attachment holes (not shown) for attachment of bumper 10 to a vehicle.

Thus a tubular bumper 10 is provided with ends and an intermediate section including a step provided in the intermediate section. Advantageously, the step is formed integrally from material of the bumper without the need for additional materials or parts. Further, the bumper is configured to maintain the overall rigidity and structural integrity of the tubular shape of the bumper, while also facilitating manufacture.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A bumper for a vehicle comprising:
   an elongated tubular member constructed from a single elongated sheet formed into an integral cross-sectional shape defining a top wall, a bottom wall, an inner wall and an outer wall, said tubular member having two ends and an intermediate section;
   said top wall and said outer wall in said intermediate section being cut to form an opening;
   said outer wall in said intermediate section being separated from said top wall by said opening and also being separated from said bottom wall by a severed juncture to thus form top and bottom edges, respectively, said outer wall in said intermediate section being further cut between said top and bottom edges to define opposing panels, said opposing panels each being integrally connected in one piece to said outer wall at one end and being formed toward said inner wall at another end to reveal an inside surface of said bottom wall in said intermediate section, said opposing panels each further including a flange engaging said inner wall; and
   means for securing each said flange to said inner wall, whereby said bottom wall in said intermediate section forms a step and the opposing panels reinforce the bumper in the intermediate section.

2. A bumper as defined in claim 1 wherein said sheet includes side edges secured together to form said tubular member.

3. A bumper as defined in claim 1 wherein said tubular member is formed by roll-forming.

4. A bumper as defined in claim 2 wherein said side edges are secured together by welding.

5. A bumper as defined in claim 1 wherein said opposing panels each include a section that extends angularly from said outer wall toward said inner wall to thus define sides of the step.

6. A bumper as defined in claim 5 wherein said means for securing each said flange includes welding each said flange to said inner wall.

7. A bumper as defined in claim 6 wherein said bottom wall includes material forming a hole adapted to receive a trailer hitch ball.

8. A bumper as defined in claim 1 wherein said bottom wall includes material forming a hole adapted to receive a trailer hitch ball.

9. A bumper as defined in claim 1 wherein at least one of said top and bottom edges of said opposing panels are welded to at least one of an adjacent section of said top wall and said bottom wall, respectively.

10. A bumper as defined in claim 2 wherein said tubular member is roll-formed.

11. A rear step bumper for a vehicle comprising:
an elongated roll-formed tubular member extending along a longitudinal axis and having a front inner wall, a rear outer wall, a top wall, and a bottom wall, all formed by the roll-forming process, said tubular member having two ends and an intermediate section, said top wall being sheared along said longitudinal axis a length of said intermediate section and proximate and parallel said front inner wall frown a first location to a second location, said top wall also being sheared transversely of said longitudinal axis from each of said first and second locations to third and fourth locations, respectively, said third and fourth locations being located proximate the juncture between said top wall and said rear outer wall, said top wall further being sheared parallel the juncture of said top wall and said rear outer wall from said third location to said fourth location thus providing an opening in said top wall, and said rear outer wall being sheared along said longitudinal axis adjacent the juncture between said rear outer wall and said bottom wall from a fifth location to a sixth location, said fifth location being substantially vertically aligned with said third location and said sixth location being substantially vertically aligned with said fourth location, said rear outer wall being severed between said fifth and sixth locations to thus define opposing panels, and said opposing panels being bent into engagement with said front inner wall to which said panels are secured, whereby said bottom wall in said intermediate section forms a step.

12. A rear step bumper as defined in claim 11 including one of a weld and a mechanical means for securing said opposing panels to said front inner wall.

13. A rear step bumper as defined in claim 12 wherein said bottom wall in said intermediate section includes material defining a hole for receiving a trailer hitch ball.

14. A rear step bumper as defined in claim 11 wherein said opposing panels extend at an acute angle to said rear outer wall to thus form the sides of the step in said intermediate section.

15. A rear step bumper for a vehicle comprising:
an elongated roll-formed tubular member extending along a longitudinal axis and defining a generally continuous cross section including a front inner wall, a rear outer wall, a top wall, and a bottom wall, all interconnected by rolled material formed by the roll-forming process;
said tubular member having two ends and an intermediate section;
an elongated opening in the top wall of said intermediate section extending along said longitudinal axis and traversely thereof from adjacent the juncture between said front inner wall and said top wall toward said rear outer wall;
said rear outer wall of said intermediate section including a sheared portion extending along said longitudinal axis adjacent the juncture between said bottom wall and said rear outer wall; and
said opening and sheared portion being cut from said tubular member to provide a reinforcement section formed in one piece with the outer wall, said reinforcement section being severed and bent toward and against said front inner wall to which said reinforcement section is secured.

16. A rear step bumper as defined in claim 15 wherein said bottom wall in said intermediate section is revealed by said opening and by said reinforcement section being bent and forms a step, said reinforcement section forming the sides of the step.

* * * * *

UNITED STATES PATENT AND TRADEMARK OFFICE
CERTIFICATE OF CORRECTION

PATENT NO. : 5,340,177
DATED : August 23, 1994
INVENTOR(S) : V. Dale Maxam

It is certified that error appears in the above-indentified patent and that said Letters Patent is hereby corrected as shown below:

Column 2, line 67;
      "and." should be --and--.

Column 3, line 65;
      "robe" should be --tube--.

Signed and Sealed this

Twenty-fifth Day of April, 1995

*Attest:*

BRUCE LEHMAN

*Attesting Officer*      *Commissioner of Patents and Trademarks*